Nov. 5, 1957 H. HECHT ET AL 2,812,487

SERVO SYSTEM WITH MAGNETIC RATE-TAKING

Filed Dec. 30, 1953 2 Sheets-Sheet 1

INVENTORS
HERBERT HECHT
PETER G. DE GRAFF
BY
R. V. Craddock
ATTORNEY

SERVO SYSTEM WITH MAGNETIC RATE-TAKING

Filed Dec. 30, 1953 2 Sheets-Sheet 2

INVENTORS
HERBERT HECHT
PETER G. DEGRAFF
BY
R. V. Craddock
ATTORNEY 2,812,487

SERVO SYSTEM WITH MAGNETIC RATE-TAKING

Herbert Hecht, Wantagh, and Peter G. De Graff, Riverhead, N. Y., assignors to Sperry Rand Corporation, a corporation of Delaware Application December 30, 1953, Serial No. 401,243

8 Claims. (Cl. 318—489)

This invention relates to improvements in servomechanisms. More particularly, it concerns a novel electrical servomechanism wherein magnetic means are provided for producing a signal proportional to the rate of change of an input control signal and magnetic amplifier means are connected to receive said rate and control signals for algebraically combining and amplifying said signals for actuating an output device in accordance with the same. In another of its aspects, the invention relates to a magnetic rate-taking device characterized by a plurality of magnetically permeable core members and associated windings to which is fed an alternating current signal voltage subject to amplitude changes representative of changes in a condition such as, for example, the attitude of an aircraft, and from which is taken a signal voltage proportional to the rate of change of such condition. This signal voltage is a direct current in one form of the magnetic rate-taking device embodying the invention and is an alternating current in another form of the device.

The use of magnetic amplifiers in electrical servomechanisms has heretofore been limited by difficulties which arise in adapting conventional rate-taking arrangements for satisfactory operation with such amplifiers. The generation of a rate term is highly desirable in position control servo systems, and is widely performed to obtain so-called "dead-beat" operation and control stability. However, the impedance levels encountered in dealing with magnetic amplifiers furnish a primary deterrent to extending the use of this type of amplifier to servo systems wherein a rate term is needed for control purposes. For example, a capacitor placed in series with the control winding of a magnetic amplifier will provide the phase lead desired for rate-taking, but unfortunately results in a sharply resonant amplitude characteristic unless the capacitor is of a magnitude beyond the practical range. A possible method of reducing the resonant peak involves the use of a forcing resistor in series with the control winding; but one thereby undesirably lowers the gain and excessively reduces the time constant of the magnetic amplifier.

The rate-taking device of the present invention overcomes the disadvantages that attend the use of conventional rate networks in providing a rate term input to magnetic amplifiers, and is particularly well-suited for a servo system employing magnetic amplifiers since the device operates from an A. C. input and is readily adapted to deliver either D. C. or A. C. rate signals at levels which are expedient for magnetic amplifier operation.

A principal object of the present invention is to provide a novel electrical servomechanism wherein control signal rate-taking, mixing, and amplification are performed magnetically.

Another object is the provision of improved magnetic means for supplying a signal output proportional to the rate of change of a signal input to the magnetic means and of a sense dependent upon the direction of change of said signal input.

Another object is to provide magnetic means of the foregoing type wherein the signal input is an alternating current voltage and the signal output is a direct current voltage.

Another object is the provision of a novel electrical rate-taking arrangement having an impedance level readily suiting it for use in magnetic amplifier systems.

Another object is to provide improved magnetic means for supplying an A. C. signal output proportional to the rate of change of an A. C. signal input to the magnetic means.

With the foregoing and still other objects in view, this invention includes the novel combinations and arrangements of elements described below and illustrated in the accompanying drawings, in which.

Figures 1, 2:
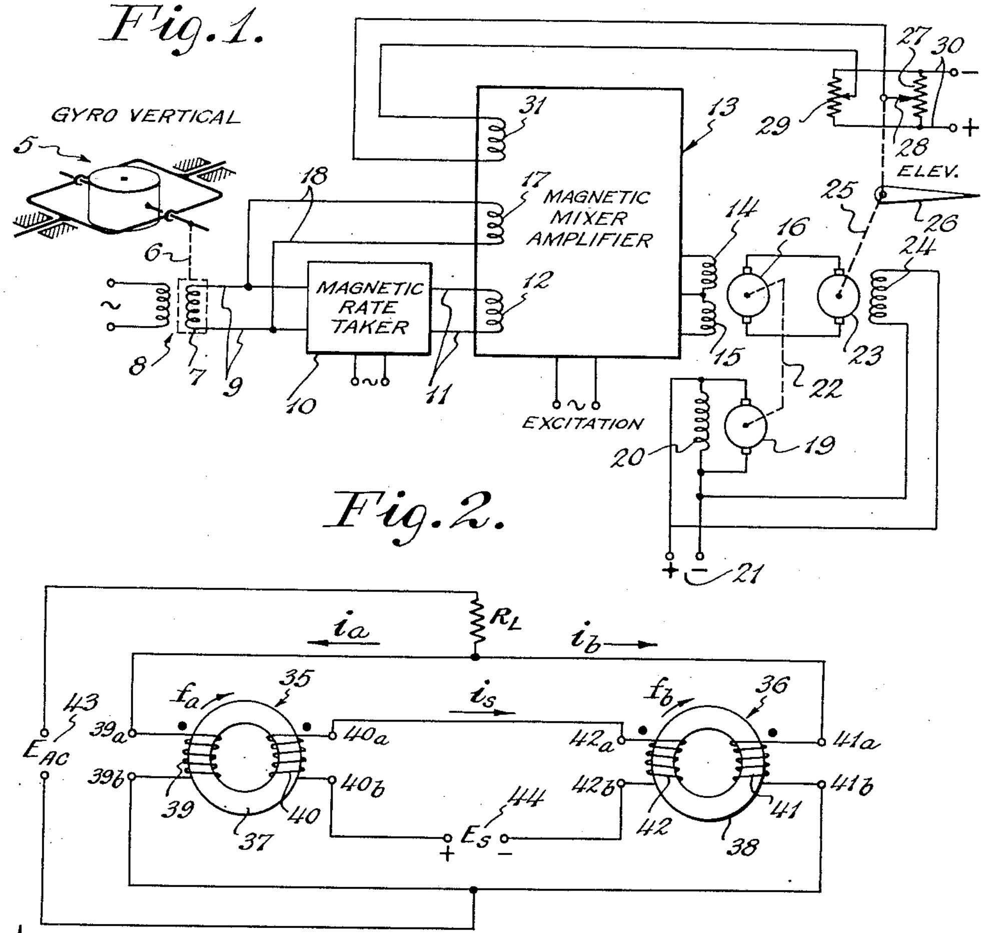
Fig. 1 is a schematic layout of a preferred embodiment of the present invention in an arrangement for automatically controlling the pitch attitude of an aircraft.
Fig. 2 is a circuit diagram for a conventional parallel-connected magnetic amplifier.

Referring to Fig. 1, a conventional gyroscopic vertical 5 has its pitch axis connected by suitable mechanical means 6 to actuate the rotor 7 of a selsyn-like transformer device 8 whose stator is excited from a suitable source of A. C. voltage. Transformer 8 is arranged to serve as a pitch pick-off for gyroscopic vertical 5, and in this regard provides an A. C. signal on rotor leads 9 of a magnitude proportional to the displacement of the aircraft from a reference pitch attitude and of a phase representative of the direction of such displacement in relation to the reference attitude.

Leads 9 feed the displacement signal to the input of a phase-sensitive magnetic rate-taking device 10 which provides a D. C. output proportional to the rate of change of said A. C. displacement signal. Rate-taker 10 is of a novel design and will be more fully described hereinafter in connection with Figs. 2–4. Its output is fed via leads 11 to a winding 12 which forms one of the D. C. control windings of a magnetic amplifier 13 of the mixer type capable of providing a net load current or output signal proportional to the algebraic sum of a plurality of A. C. and D. C. input signals. Such a magnetic mixer-amplifier is fully described in copending U. S. application Serial No. 320,558, filed on November 14, 1952, in the name of Sidney B. Cohen and assigned to the assignee of the present application. In the present case, the load comprises the differential field windings 14, 15 of a D. C. generator 16.

Besides being fed a D. C. signal input proportional to the rate of change of the displacement of the craft from the reference pitch attitude, mixer-amplifier 13 is also provided with an A. C. signal input proportional to the displacement itself. This latter signal is fed to an A. C. control winding 17 of device 13 via leads 18 which are connected across rotor leads 9 of pick-off 8.

Variable field generator 16 forms part of a simple Ward-Leonard drive comprising a drive motor 19 having a field winding 20 energized across terminals 21 which are connected to a fixed D. C. supply. Motor 19, thus energized, is mechanically connected through suitable means 22 for rotatably driving the generator at constant speed. Connected to the electrical output of the generator is a D. C. servomotor 23 having a fixed field winding 24 connected across D. C. supply terminals 21. The output shaft of the servomotor is connected through a suitable mechanical means 25 both to drive an aircraft control surface, such as an elevator element 26, and to actuate a signal generator for providing a negative feedback surface displacement signal to the mixer-amplifier. The signal generator, for example, may be a normally-balanced resistance bridge comprising a variable potentiometer 27 having a wiper arm 28 mechanically connected to servomotor 23, and a fixed potentiometer 29 electrically connected across potentiometer 28 and a suitable source of D. C. excitation voltage at terminals 30 and having a mid-tap to which one side of a D. C. control winding 31 in mixer-amplifier 13 is electrically connected, the other side being electrically connected to wiper 27. A negative feedback signal is generated by this arrangement by properly selecting the sense in which wiper 28 is driven in relation to the polarity of terminals 30 and the direction of servomotor 23 such that elevator 26 is positioned in accordance with the A. C. and D. C. inputs to mixer-amplifier 13.

By the foregoing arrangement, an A. C. displacement signal derived from the pitch pick-off of the gyroscopic vertical is fed together with a D. C. signal representing the rate of change of the displacement signal to the input of mixer-amplifier 13. The output of the mixer-amplifier is a net direct current which flows through the controllable field windings 14, 15 of generator 16 with a magnitude and sense such that the resulting output of the generator energizes servomotor 23 in a manner causing the same to position elevator 26 in accordance with the sum of the A. C. and D. C. inputs to mixer-amplifier 13, a D. C. signal being fed back to the latter in negative feedback fashion from the motor-driven signal generator comprising bridge-connected potentiometers 27, 29.

Before describing magnetic rate-taking device 10 in detail, it is deemed advisable first to set forth and illustrate the principle upon which this aspect of the invention is based. That is to say, in a D. C. controlled A. C. output magnetic amplifier, changes in the A. C. excitation bring about a variation of the average flux level in the core. And it has been found that this variation of average flux produces a D. C. signal in the control winding of the amplifier which is proportional to the rate of change of the amplitude of the A. C. excitation.

The circuit shown in Fig. 2 will hereinafter be employed to illustrate the foregoing principle, and comprises a conventional parallel-connected magnetic amplifier in which the A. C. output current is controlled by a D. C. signal. Ordinarily, in such a circuit rectifiers are employed to produce self-saturation and thereby increase the gain of the unit; but, since rectifiers may be considered to modify the magnetic characteristics of the core and since this discussion of theory will deal with an assumed magnetization curve (Fig. 3), the rectifiers are omitted from Fig. 2. This drawing does, however, show a pair of identical reactors 35, 36 comprising generally toroidally-shaped cores 37, 38 made of a suitable paramagnetic material. Core 37 is provided with an excitation winding 39 having terminals 39*a*, 39*b* and a control winding 40 having terminals 40*a*, 40*b*. Core 38 is provided with an excitation winding 41 having terminals 41*a*, 41*b*, and a control winding 42 having terminals 42*a*, 42*b*. Excitation windings 39, 41 are connected in parallel across a suitable source 43 of A. C. excitation voltage $E_{ac}$, and a load resistor $R_L$ is placed in series with this parallel connection. Control windings 40, 42 are connected in series with a suitable source 44 of D. C. signal voltage $E_s$. The arrangement of windings 39, 41 is such that a given half-cycle of excitation voltage causes magnetomotive forces of the same direction to be set up in cores 37, 38. For example, assuming that a positive half-cycle produces positive coil currents $i_a$, $i_b$ flowing in the direction shown by arrows in Fig. 2, then positive magnetomotive forces $f_a$, $f_b$ will be produced in cores 37, 38, respectively, having the clockwise direction also shown by arrows.

Control windings 40, 42 are arranged such that the application of a voltage pulse making terminals 39*a*, 41*a* positive with respect to terminals 39*b*, 41*b*, causes a pulse to appear which is positive at terminals 40*a*, 42*a* with respect to 40*b*, 42*b* (as indicated by the dot polarity signs). When a current $i_s$ flows in its positive direction through windings 40, 42, as indicated by the arrow, it causes a negative magnetomotive force in the core 37, but a positive magnetomotive force in core 38.

Figure 3:
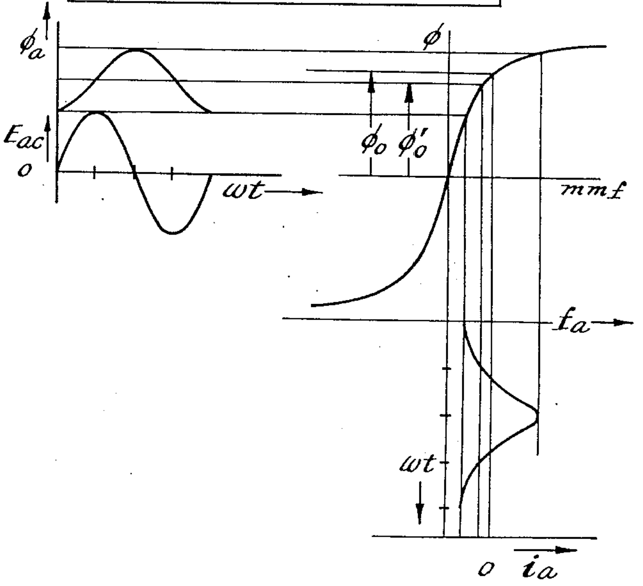
Fig. 3 is a family of curves plotted to show the effect of A. C. excitation voltage variations in the magnetic amplifier of Fig. 2.

An assumed magnetization curve for cores 37, 38 and the wave-form of an applied sinusoidal voltage $E_{ac}$ are shown in Fig. 3. Since the flux $\phi$ is equal to $$\frac{1}{N}\int E_{ac}dt$$

where N represents the number of winding turns, and since the integral of a sine wave is a cosine wave, then it is apparent that the flux wave will phase lag the applied voltage by 90°. Assuming an average value of flux $\phi_0'$ for the condition when both $E_{ac}$ and a steady D. C. current from source 44 are applied, the flux wave is readily plotted through one cycle of $E_{A.C.}$ as shown above the voltage wave in Fig. 3. Faraday's law will give the magnitude of this flux. The wave-form representing the M. M. F. or winding current which produces this flux is then obtained by projecting the flux wave on the magnetization curve and plotting the M. M. F. or winding current through one cycle of $E_{ac}$ as shown below the magnetization curve in Fig. 3.

The equation for the power circuit of core 37 is as follows:

$$E_{ac}=i_aR_L+N_{39}\frac{d\phi_{37}}{dt}$$

$$\therefore \phi_{37}=\frac{1}{N_{39}}\int(E_{ac}-i_aR_L)dt$$

From the foregoing expression for $\phi_{37}$, it is seen that no D. C. current can be carried by winding 39 (nor winding 41); since if $i_a$ (or $i_b$) contained a D. C. (average) component, $\phi_{37}$ (or $\phi_{38}$) would eventually become infinite. This, of course, does not happen. Therefore, the average value of the M. M. F. in Fig. 3 must be exactly the value set by the D. C. control circuit. And, in order to find the steady flux produced by the D. C. control circuit, one need only to project the averave M. M. F. upwardly to intersect the magnetization curve in Fig. 3, as shown. This flux, $\phi_0$, is of a higher value than the flux $\phi_0'$ obtained in the presence of A. C. That is to say, when $E_{A.C.}$ is applied to windings 39, 41, the average flux in cores 37, 38 is reduced from $\phi_0$ to $\phi_0'$. The amount of the reduction is proportional to the magnitude of the A. C. applied.

Assume now that the A. C. is suddenly removed from the magnetic amplifier by opening windings 39, 41. The flux immediately tries to change from $\phi_0'$ to $\phi_0$. Flux linkages, however, cannot be changed instantaneously; hence a current must flow in the control winding (the only available closed circuit) in order to support the discrepancy in flux linkages between $\phi_0'$ and $\phi_0$. The induced voltages in the two cores add and assume a maximum value at the instant that windings 39, 41 are opened—the greatest difference of flux linkages existing at this moment—and decay with the time constant of the control circuit. This is the response of a physical rate network to a step function input.

Thus, from the foregoing, it is seen that in a D. C. controlled A. C. output magnetic amplifier, changes in the A. C. excitation vary the average flux level in each of the cores. This variation of average flux is picked up by the control winding, resulting in the production of a D. C. signal therein proportional to the rate of change of A. C. signal amplitude and pulsating at a frequency twice that of the A. C. signal.

Figure 4:
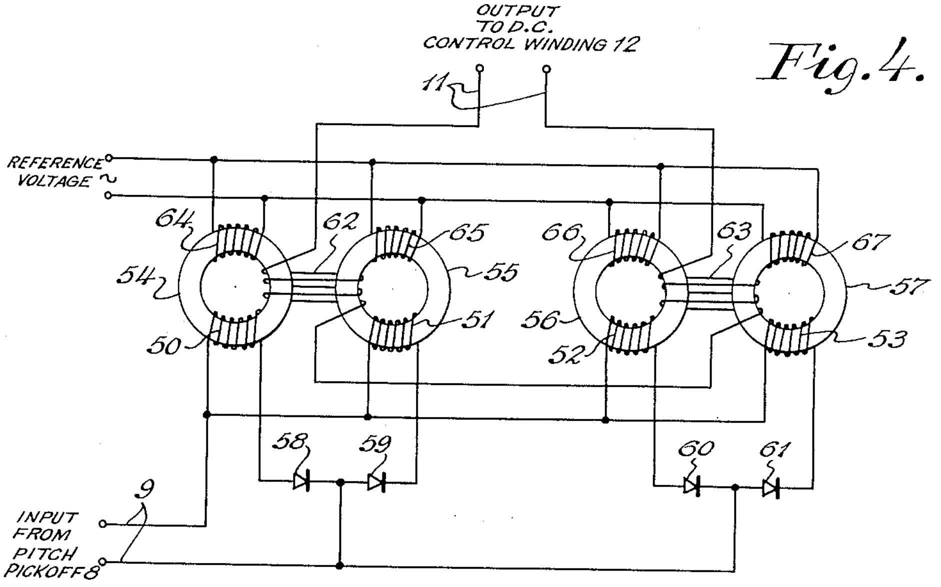
Figs. 4 and 5 are schematic diagrams of different forms of the magnetic rate-taking device of the present invention.

Fig. 4 shows a practical and novel circuit for the magnetic rate-taking device 10 of Fig. 1 based on the operating principle just expounded in connection with Figs. 2 and 3. Instead of employing a two-core unit, as discussed in the theory of operation, it is prefered to use a four-core unit consisting of two two-core units connected in push-pull fashion with respect to the input signal. By this arrangement, greater linearity may be achieved as well as decreased dependency on circuit parameter variations. In Figs. 1 and 4, it will be noted that the source of normally constant-amplitude A. C. excitation voltage is replaced by A. C. signal generator 8 which provides a variable voltage or signal input to rate-taker 10 via leads 9. This variable A. C. voltage or signal input is connected in parallel with each of substantially identical windings 50, 51, 52, and 53 on substantially identical paramagnetic cores 54, 55, 56, and 57, respectively. Cores 54 and 55 comprise one two-core unit, and cores 56 and 57 comprise the second two-core unit.

Self-saturation is preferably provided in a well-known manner by a first pair of oppositely-poled rectifiers 58, 59, respectively connected in separate series circuit relation with windings 50, 51 across pick-off leads 9. Correspondingly, a second pair of oppositely-poled rectifiers 60, 61 are respectively connected in separate series circuit relation with input windings 52, 53 across the pick-off leads, rectifier 60 being poled like rectifier 58 while rectifier 61 is poled like rectifier 59. By this arrangement of rectifiers in circuit with the respective input windings, an appreciably higher gain is obtained from the magnetic rate-taker relative to that obtainable in the absence of such devices.

A winding 62 wound around cores 50, 51 is the counterpart of series-connected windings 40, 52 of Fig. 2 insofar as the first two-core unit is concerned, and a winding 63 wound around cores 56, 57 is their counterpart insofar as the second two-core unit is concerned. However, instead of either of these windings 62, 63 being connected in series to a source of D. C. signal voltage, they are connected by leads 11 in series with D. C. control winding 12 of magnetic-mixer amplifier 13 (Fig. 1) so as to supply a D. C. rate signal input thereto for mixing and amplification with the A. C. displacement signal on control winding 17 and the D. C. negative feedback signal on control winding 31, as hereinbefore described.

In order to obtain phase sensing in the magnetic rate taker, it is necessary to supply an A. C. reference voltage thereto, since the apparatus operates on the absolute value of the A. C. signal input. For this purpose, it is preferred to provide separate windings 64, 65, 66, and 67 connected in parallel with a suitable source of A. C. having the same frequency and phase as the A. C. applied to the stator of pick-off 8 and wound about cores 54—57, respectively. By thus isolating the reference voltage from the signal voltage, thereby to let the addition of the two voltages be performed magnetically, spurious outputs are substantially prevented from arising due to variations in the reference voltage. Moreover, the use of separate windings permits flexibility of turns and utilization of existing voltages in the system.

Reference windings 64—67 are wound on their respective cores in relation to output windings 62, 63 so as to induce no net current therein. That is to say, whatever current winding 64 tends to induce in winding 62 is nullified by the tendency of winding 65 to induce an equal and opposite current in winding 62; and, similarly, whatever current winding 66 tends to induce in winding 63 is nullified by the tendency of winding 67 to induce an equal and opposite current in winding 63.

Signal or input windings 50—53 are wound on their respective cores in relation to output windings 62, 63 so as to induce no net current therein so long as the amplitude of the input does not vary. That is to say, under this condition whatever current that windings 50, 51 tend to induce in winding 62 is nullified by the tendency of windings 52, 53 to induce an equal and opposite current in winding 63. Moreover, the windings 50—53 are so arranged that a signal fed thereto of a phase with respect to the reference voltage such that the total A. C. applied to cores 50, 51 is increased to decrease the average flux in these cores, will be a signal which simultaneously operates to decrease the total A. C. applied to cores 52, 53 and increase the average flux therein.

By this arrangement, the average flux levels in the cores are varied by any variations which may occur in the amplitude of the A. C. signal applied from pick-off 8. And since flux linkages can not be changed instantaneously, a current will flow in available closed circuits in order to support the discrepancy between said flux linkages. One such available circuit is formed by output windings 62, 63 which are series-connected with magnetic amplifier winding 12; hence, a current due to the A. C. input signal variation will flow therein. This current will flow as long as the variation continues, after which time it decays in accordance with the time constant of the output circuit; it, moreover, is a direct current and is proportional to the rate of change of the A. C. signal fed to input windings 50—53. A 180 degree change in phase of the signal voltage, as when the aircraft moves from a nose-down attitude through reference attitude to a nose-up attitude, produces a change in the sense or polarity of the D. C. rate signal output.

Other available circuits wherein there is a tendency for a current to flow due to a variation in the A. C. input signal comprise the reference voltage circuit and the input circuit itself. However, this tendency is discouraged almost completely in the reference voltage circuit by employing a high impedance reference voltage source, and is discouraged by impedance to a somewhat lesser extent in the input circuit since the choice of this latter impedance is limited by the effect such impedance has in lowering the gain of the system. In any event, without unduly impairing operation, the impedance of the output circuit of the magnetic rate-taker may readily be made sufficiently low relative to the other available closed circuits in the device so as to cause the transient supporting current or rate signal to flow virtually wholly in the output circuit comprising windings 62, 63 and leads 11.

Figure 5:
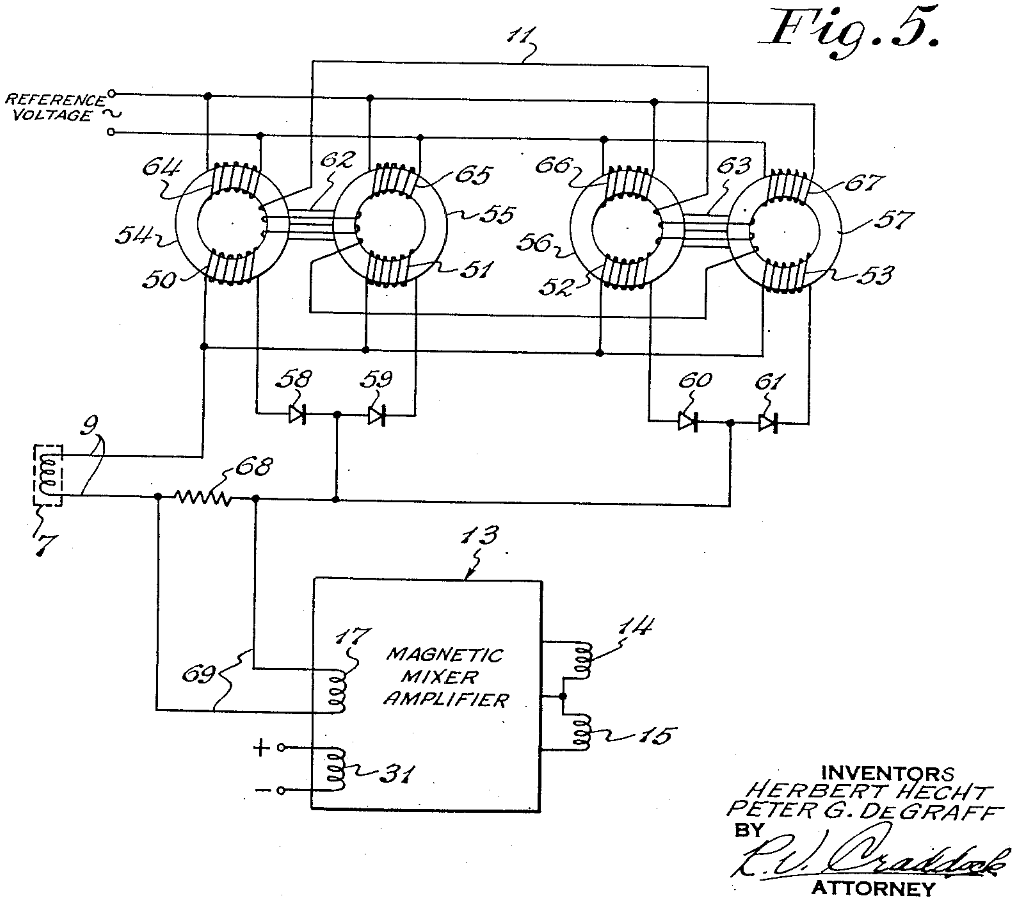

On the other hand, the arrangement of Fig. 4 may be slightly modified so as gainfully to employ the rate component picked up in the input circuit. In other words, this rate component, instead of being suppressed and merely tolerated in favor of the rate component picked up in windings 62, 63, may be emphasized and used in lieu thereof as the output of the magnetic rate-taker. Fig. 5 serves to illustrate a modification of the arrangement of Fig. 4 which will accomplish this end.

Comparing Fig. 5 to Fig. 4, it will be noted in Fig. 5 that instead of leads 11 being connected across D. C. control winding 12 of mixer-amplifier 13, they are connected directly together to form a closed circuit consisting only of windings 62, 63 in series. These windings are preferably retained for the added flux linkages they provide on variation of the pick-off signal. Moreover, a resistor 68 is inserted in one of the leads 9 so as to be in series with pick-off rotor 7; and instead of control winding 17 of mixer-amplifier 13 being connected across rotor 7 as shown in Fig. 1, it is now connected via a pair of leads 69 across the resistor 68. By this arrangement, mixer-amplifier control winding 17 is energized not only by a signal proportional to the displacement of the craft from the reference pitch attitude but also by the signal component produced in the input circuit which is proportional to the rate of change of said displacement. This rate term is an alternating current signal of fundamental frequency and of a sense or phase dependent on the direction of the change in displacement on either side of the reference attitude. In other words, the rate signal has one sense when the displacement increases from null in one direction and the opposite sense when the displacement increases from null in the other direction.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A magnetic rate-taking device comprising two pairs of paramagnetic cores, each pair having a common winding and each core having a first A. C. winding, said common windings being connected in series relation and said first A. C. windings being connected in parallel, a source of variable amplitude A. C. signal connected across said first A. C. windings, means for providing a unidirectional or biasing magnetic flux in each of said cores, and a source of constant amplitude reference A. C. of the same frequency as said variable amplitude A. C. signal, each core having a second A. C. winding thereon connected in parallel with said constant amplitude source, said first and second A. C. windings being wound on said cores with respect to said common windings thereon such that the A. C. flowing in half the number of the respective A. C. windings tends to induce alternating currents respectively of a given phase and magnitude in said series-connected common windings while the A. C. flowing in the other half of the respective A. C. windings tends in said common windings to induce alternating currents respectively of a phase opposite to said given phase but of the given magnitude, whereby net transient currents may be induced in said common and A. C. windings, respectively, in accordance with variations of said variable signal from one peak value to another.

2. A magnetic rate-taking device comprising two pairs of paramagnetic cores, each pair having a separate one of two series-connected common windings and each core having a first A. C. winding, a source of alternating signal voltage connected to said first windings, said signal voltage being of an amplitude proportional to the displacement of an object from a null position and being of one phase for displacements on one side of said null position and of opposite phase for displacements on the other side, means for providing a unidirectional or biasing magnetic flux in each of said cores, a source of alternating reference voltage of substantially the same phase as one of the phases of said signal voltage, each core member having a second A. C. winding thereon connected to said reference voltage source, said first and second A. C. windings being so wound on their respective cores that the alternating magnetic flux they produce in their respective cores add in each of one of said pairs of cores and subtract in each of the other of said pairs of cores depending on the phase of said signal voltage, whereby aiding direct currents may be respectively induced in said common windings whenever a change takes place in the average value of said signal voltage, the aggregate direct current having a magnitude in proportion to the rate of said change and a polarity in accordance with the direction of said change.

3. A system for magnetically providing a composite electrical control signal having one component proportional to a variable signal input to the system and another component proportional to the rate of change of said signal input, said system comprising a source of alternating current signal input voltage of a given frequency, a resistance element, an assembly of paramagnetic cores and associated windings including a first plurality of windings connected in closed electrical circuit relation with both said signal source and resistance element and a second plurality of windings connected in series to form a second closed electrical circuit, means for producing a unidirectional or biasing magnetic flux in each of said cores, said first plurality of windings being arranged on said cores in relation to said second plurality of windings such that half the number of said first windings tends to induce an alternating current of a given phase and magnitude in said second circuit while the other half tends to induce therein an alternating current of a phase opposite to said given phase and of the given magnitude, and means for changing the peak amplitude of said alternating current signal input, said change causing a transient alternating current of said given frequency and of amplitude proportional to the rate of change of amplitude of said input to be induced in said first plurality of windings, whereby the voltage drop across said resistance element represents the desired composite control signal.

4. A magnetic rate-taking device comprising two pairs of paramagnetic core members, each pair having a common output winding and each core member having a separate input winding, a source of alternating signal voltage of a peak amplitude proportional to the displacement of an object from a null position, said signal voltage being of one phase for displacements on one side of said null position and of opposite phase for displacements on the other side, a first pair of current rectifying devices, said first rectifying devices being oppositely poled and connected in separate series circuit relation with respective ones of the input windings of one of said pairs of cores across said source of signal voltage, a second pair of current rectifying devices, said second rectifying devices being oppositely poled and connected in separate series circuit relation with respective ones of the input windings of the other of said pairs of core members across said source of signal voltage, a source of alternating reference voltage having a phase substantially the same as one of the phases of said signal voltage, each core member having a separate winding thereon connected in parallel relation with said source of reference voltage, said reference voltage windings and said input windings being so arranged that the alternating magnetic flux they produce in their respective cores add in each of one of said pairs of cores and subtract in each of the other of said pairs of cores depending on the phase of said signal voltage, whereby on connecting said output windings in series-opposed relation with a load, a direct load current is generated whenever a change takes place in the peak amplitude of said signal voltage, said load current having a magnitude in proportion to the rate of said change and a polarity in accordance with the direction of said change.

5. An all-magnetic servomechanism comprising a source of variable A. C. signal, a first saturable reactor device connected to said source and responsive to transient variations in said A. C. signal for producing time-decaying output signals having maximum values proportional to the rates of change of said A. C. signal, a second saturable reactor device connected to said first device and to said source for magnetically mixing and amplifying the signals produced by said source and first device, motive means including a servomotor connected to the second device for energization according to the output of said second device, and signal generating means actuated by said servomotor and connected to said second device for providing a feedback signal to the latter.

6. A system for controlling the attitude of a dirigible craft comprising attitude responsive means for providing an A. C. signal of an amplitude proportional to the displacement of the craft from a reference attitude, magnetic rate-taking means connected to said attitude responsive means and responsive to transient variations in the A. C. signal provided thereby for producing time-decaying output signals having maximum values proportional to the rates of change of said A. C. signal, magnetic mixing and amplifying means connected to said attitude responsive means and said magnetic rate-taking means for mixing and amplifying said A. C. and rate signals to provide a resultant signal, and attitude control means connected to said last-mentioned means for controlling said craft according to said resultant signal.

7. A system for controlling the pitch attitude of an aircraft comprising an assembly of paramagnetic cores having input and output windings, a gyroscopic vertical including signal generating means connected to said input windings for supplying an A. C. input signal thereto dependent on the displacement of the craft from a given pitch attitude, said input windings being wound on said cores relative to the output windings thereon so that an output signal is developed in said output windings dependent on the rate of change of said A. C. input signal, whereby said output signal is a measure of the rate of change of craft pitch, magnetic mixing and amplifying means having control and load windings, a control surface actuable for controlling the pitch of said craft, and controllable motive means including a servomotor connected to actuate said control surface, the control windings of said magnetic mixing and amplifying means being connected to receive the respective signal outputs of said signal generating means and said output windings for mixing and amplifying the same to produce a resultant signal in said load windings, said load windings being connected to said controllable motive means and forming a controlling portion thereof.

8. A magnetic rate-taking device comprising an assembly of paramagnetic cores and associated windings including an input winding circuit and an output winding circuit, means for producing a unidirectional or biasing magnetic flux in said cores, and a source of variable A. C. connected to energize said input winding circuit, said input and output winding circuits respectively including pluralities of connected windings wound on said cores in such relation to one another that a transient current is caused to flow in said output circuit only upon variation of said variable A. C., said transient current decaying at a predetermined rate upon cessation of said variation and having a maximum value proportional to the rate of said variation.

References Cited in the file of this patent

UNITED STATES PATENTS

| | | |
|---|---|---|
| 2,257,031 | Barth | Sept. 23, 1941 |
| 2,351,977 | Kronenberger | June 20, 1944 |
| 2,644,124 | Broadbent | June 30, 1953 |